United States Patent [19]

Leicht

[11] Patent Number: 5,482,201
[45] Date of Patent: Jan. 9, 1996

[54] TRANSPORT DEVICE AND PROCESS FOR A VAPOR-PHASE SOLDERING INSTALLATION

[76] Inventor: Helmut W. Leicht, Messerschmittring 61, 86343 Königsbrunn, Germany

[21] Appl. No.: 295,764

[22] PCT Filed: Mar. 4, 1993

[86] PCT No.: PCT/EP93/00493

§ 371 Date: Sep. 2, 1994

§ 102(e) Date: Sep. 2, 1994

[87] PCT Pub. No.: WO93/17824

PCT Pub. Date: Sep. 16, 1993

[30] Foreign Application Priority Data

Mar. 6, 1992 [DE] Germany .......................... 42 07 166.6

[51] Int. Cl.[6] .................. B23K 37/047; B23K 31/02; B65G 49/04
[52] U.S. Cl. ........................ 228/49.5; 228/234.2
[58] Field of Search .......................... 228/180–181, 228/234.2, 42, 49.5

[56] References Cited

U.S. PATENT DOCUMENTS

| | | | |
|---|---|---|---|
| 4,032,033 | 6/1977 | Chu et al. | 228/234.2 |
| 4,077,467 | 3/1978 | Spigarelli | 228/234.2 |
| 4,466,791 | 8/1984 | Jacobs et al. | 228/234.2 |
| 4,634,000 | 1/1987 | Plapp et al. | 198/800 |
| 4,897,934 | 2/1990 | Peck | 34/78 |

*Primary Examiner*—Samuel M. Heinrich
*Attorney, Agent, or Firm*—Parmelee, Bollinger & Bramblett; George W. Rauchfuss, Jr.

[57] ABSTRACT

The invention relates to a transport device and process for loading and removing the part to be soldered in a vapor-phase soldering equipment, in which a support for the part to be soldered is taken in its original direction into and out of a medium container for vapor-phase soldering and a plurality of sealing doors prevent soldering vapor from escaping. The advantages of the invention lie in the simple and economical manufacture of the transport device and low soldering medium consumption.

18 Claims, 3 Drawing Sheets

TRANSPORT DEVICE AND PROCESS FOR A VAPOR-PHASE SOLDERING INSTALLATION

The present invention relates to a transport device and process for loading and removing the part to be soldered in a vapor-phase soldering installation or equipment.

The minimization of soldering vapor escape is an important criterion for a vapor-phase soldering equipment since the corresponding chemical substances are very costly.

Therefore, many efforts were made in the prior art to minimize the losses in vapor-phase soldering equipments. In this connection, the transport system for the part to be soldered is an important factor because soldering vapor can escape when the part to be soldered enters and exits the equipment.

Ideally, the transport system of a vapor-phase soldering equipment should guarantee that the part to be soldered, i.e. the workpiece, is conveyed without jerks while allowing horizontal and vertical movements, that the workpiece is maintained in a horizontal position and that soldering vapor is prevented from escaping.

German Patent No. 39 15 046 discloses a chain conveying means for printed-board assemblies or circuit modules in a vapor-phase soldering equipment. Said means is divided into three separate conveying belt sections which horizontally transport a workpiece support that is suspended on chains. The first section conveys the workpiece from the environment into the soldering equipment, the second section transports it through the soldering equipment where the workpiece is soldered, and the third section carries the soldered workpiece out of the soldering equipment. In this document, a transport path of some length which comprises transition points between the conveying sections is provided. The conveying means is suited for the treatment of large quantities; it has a complicated structure and prevents larger amounts of soldering medium from escaping from the equipment during the transport of the workpiece, in particular because of its separation into a plurality of conveying sections.

Such a system, however, involves considerable costs which are too high for smaller users or for laboratory applications; and it does not guarantee either that the workpiece is transported completely without jerks.

In contrast to this, the object of the present invention is to provide a transport device and a process for vapor-phase soldering equipments which meet the above requirements but are simple and economical.

This object is achieved with the features of the claims.

The solution of the invention is based on the idea to have the workpiece support pivot about an axis when it enters and exits the vapor-phase soldering equipment and to maintain at the same time the original direction of the workpiece support (generally horizontally). In a preferred embodiment of the present invention, the workpiece support is formed as one side of a parallelogram and three sides of the parallelogram are turned about the corners of the fourth side. The direction of the plane of the workpiece support is maintained in all pivoting positions and it is guaranteed that the horizontal position of the workpiece is maintained, if desired, during the transport and immersion into a medium container in which the soldering is performed. Preferably one sealing flap or door, more preferably two sealing doors in the transport path of the workpiece support which open and close alternately prevent a direct contact of the medium container with the environment outside the soldering equipment during loading and removal of the workpiece and thus prevent soldering vapor from escaping.

The advantages of the present invention lie in the completely jerk-free transport of the workpiece, the constant position of the workpiece, small required space and a reduction of soldering vapor losses. In addition, the simple construction permits a very economical manufacture of the transport device.

In the following, the invention is described in more detail with reference to the drawings in which:

FIG. 1 is a cross section of a vapor-phase soldering equipment with an inventive embodiment without sealing doors, FIG. 2 is a top view of the inventive embodiment according to FIG. 1, FIG. 3a is a cross section of a vapor-phase soldering device with an inventive embodiment with sealing doors, FIG. 3b shows three positions of the first sealing door and of the workpiece support according to FIG. 3a when the workpiece support enters the soldering equipment, and FIG. 3c shows three positions of the second sealing door and of the workpiece support according to FIG. 3a when the workpiece support enters the soldering equipment.

FIG. 1 shows a transport device 4, 5a, b, 6a, b and 7a, b according to the invention in a vapor-phase soldering equipment comprising a housing 1, an aperture 2 with an aperture door 2a and a medium container 3 in which the soldering is performed. The medium container 3 contains the soldering medium in the vapor-phase 8 which is produced from the liquid 9 by the heating device 10. The transport device consists of a workpiece support 4 and a transport unit which comprises struts 6a and 6b. The workpiece support 4 is pivotably connected in bearings 5a and 5b, respectively, to the upper ends of the struts 6a and 6b. The struts 6a and 6b which form together a holder and a stabilizing device for the workpiece support 4 are pivotably connected at their lower ends to a drive shaft 7a and a bearing shaft 7b, respectively. The workpiece support 4, the struts 6a and 6b and the imaginary connecting line between the shafts 7a and 7b form a parallelogram so that, when the struts 6a and 6b pivot about the driving shaft 7a or the bearing shaft 7b, respectively, the workpiece support 4 is only displaced in parallel with respect to its original position. In this way, the workpiece remains in the same posture during the transport and the soldering process. The device conveys the workpiece without jerks and it may be stopped at any desired position, for instance for performing preheating or cooling processes.

FIG. 2 shows a top view of the transport device according to FIG. 1 in three positions I, II and III which correspond to the respective positions in FIG. 1. In this example, the workpiece support 4 remains horizontal in all positions. It is, however, also possible to convey the workpiece support 4 in a slightly inclined position, for instance to allow any condensed soldering medium to run off.

The struts 6a and 6b may be formed as straight or bent rods. Furthermore, it is possible to mount the transport device according to the invention on a carriage or slide to move it horizontally so that the workpiece support 4 describes an elongated elliptical orbit.

FIG. 3a shows the transport device according to the present invention with two sealing doors K1 and K2. These sealing doors are located behind one another in the transport path of the workpiece support 4 and behind the aperture 2 equipped with the aperture door 2a. The sealing door K1 can be pivoted about an angle of 90° whereas the pivoting angle of the sealing door K2 is greater than 90°. The sealing doors alternately seal the housing 1 against escaping soldering vapor when the workpiece support 4 has passed through the corresponding apertures of the sealing doors. The sealing doors open and close continuously, subsequently to the movement of the workpiece support 4.

After soldering, the workpiece support 4 and the sealing doors K1 and K2 move into the opposite direction for removing the workpiece from the soldering equipment.

In a simplified embodiment, only one sealing door K2 can be used instead of two sealing doors. This sealing door is closed when the aperture door 2a is open, then it opens in front of the moving workpiece support 4 and closes behind the workpiece support when the latter moves back. The embodiment with two sealing doors K1, K2 is, however, preferred because soldering vapor is prevented from entering into the region around the aperture door 2 and thus soldering medium losses are even more reduced.

In another embodiment according to the invention (not shown) the transport device can be provided with two transport units and four sealing doors K1 to K4 to convey the workpiece into and out of the soldering equipment through two different apertures 2. In this embodiment, the second transport unit receives the workpiece support 4 with the workpiece after the soldering and conveys it to the second aperture. The sealing doors K3 and K4, which are additionally provided, are located in front of the additional aperture, in analogy to the sealing doors K1 and K2.

In a simplified version of this embodiment, it is also possible to use only two sealing doors instead of four sealing doors.

In addition, one or more devices for precipitating escaped vaporous soldering medium may be arranged in the region between the aperture door(s) 2a and the sealing door(s) K2.

Figure 1:
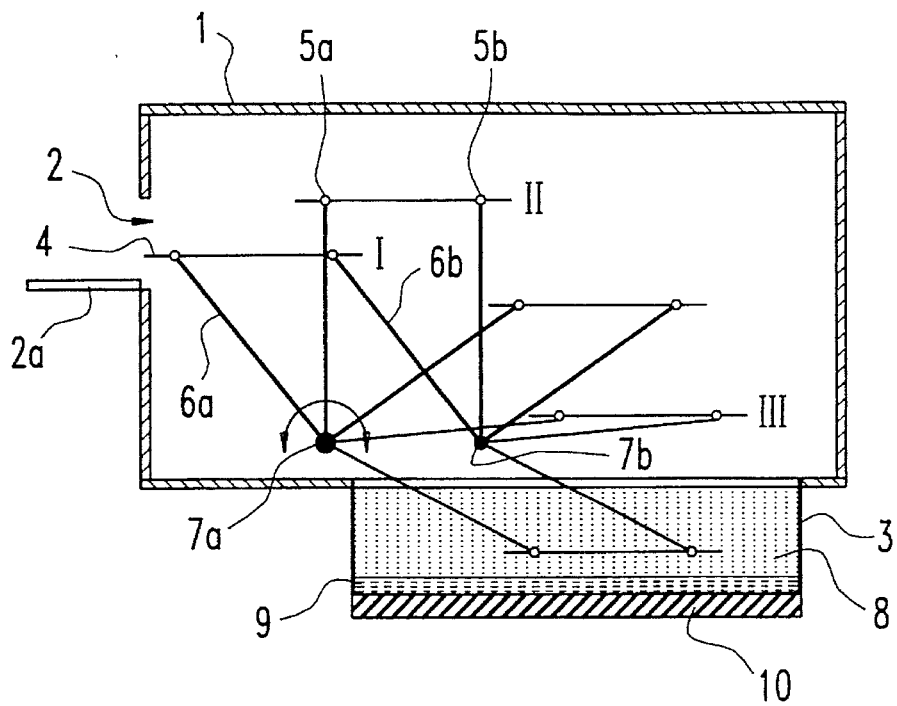
Figure 3A:
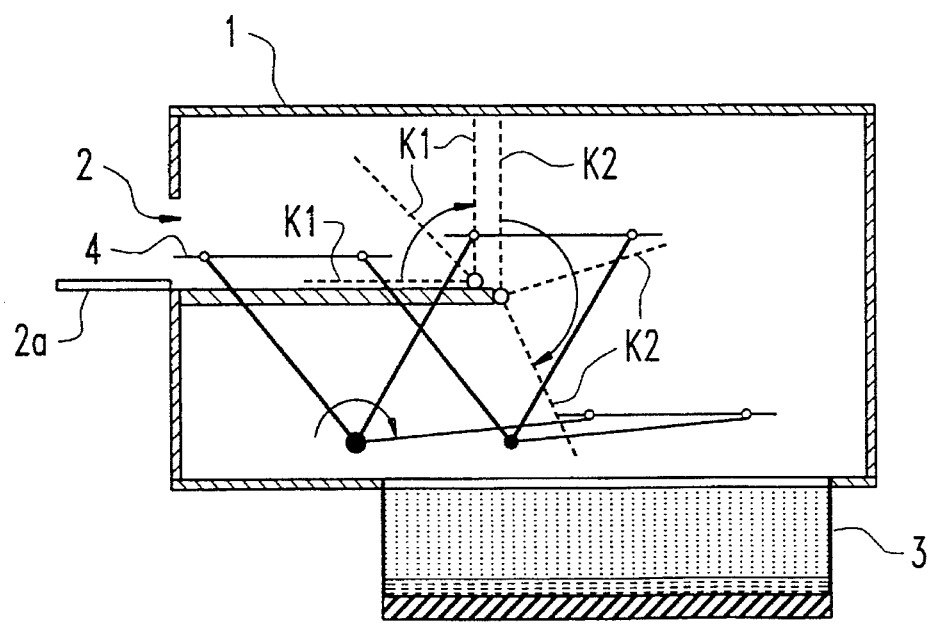
FIG. 3b shows three positions 1 to 3 of the workpiece support 4 and of the sealing door K1 when the workpiece enters the soldering equipment.
FIG. 3c shows three positions 1 to 3 of the workpiece support 4 and of the sealing door K2 when the workpiece enters the soldering equipment.
Figure 2:
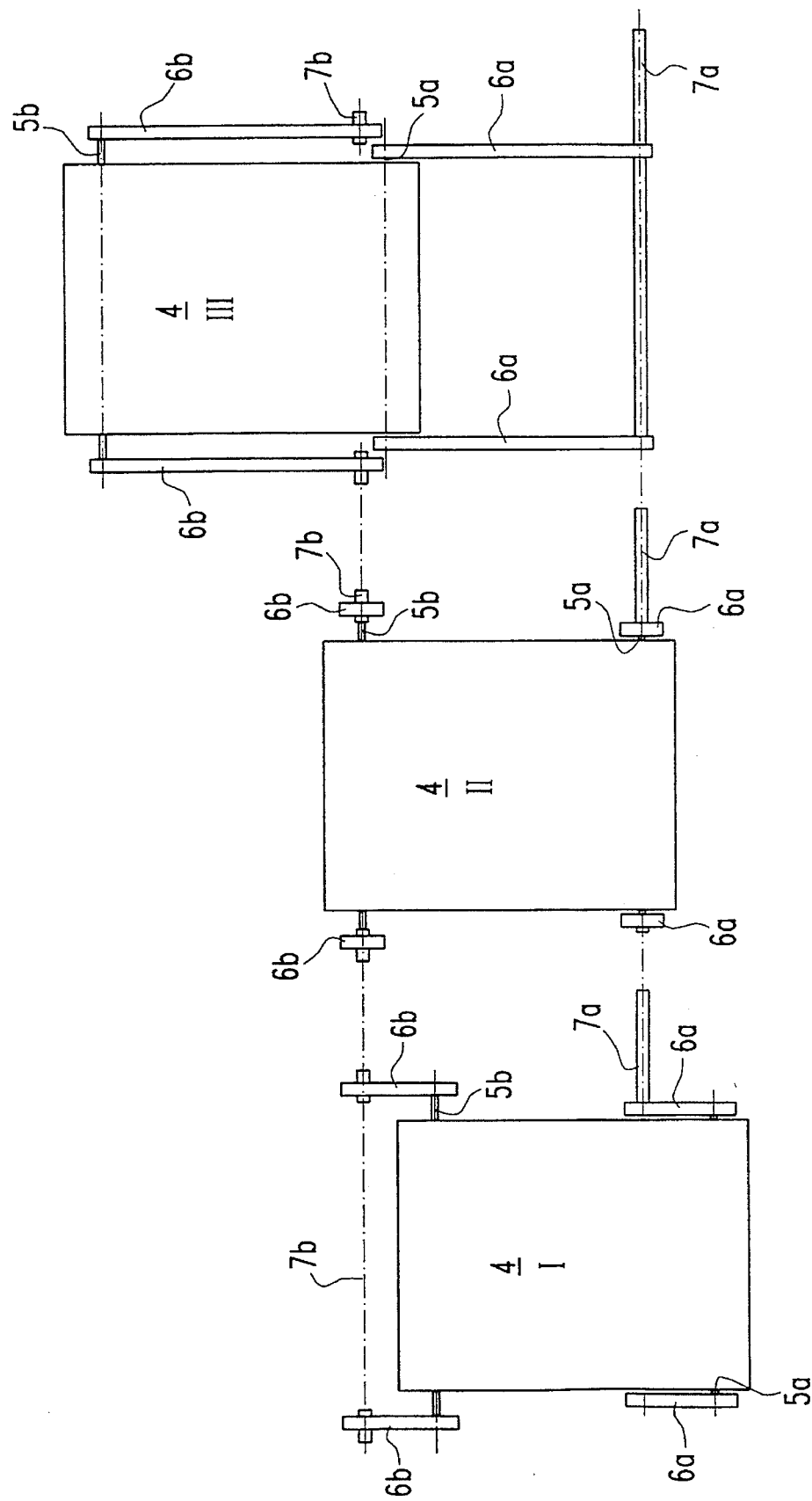
Figure 3B:
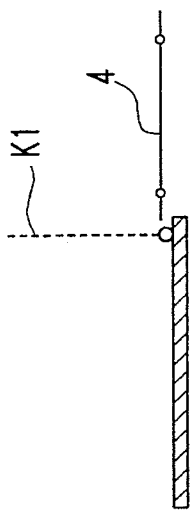
Figure 3B:
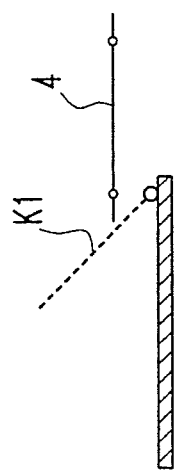
Figure 3B:
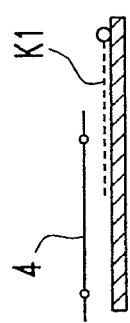
Figure 3C:
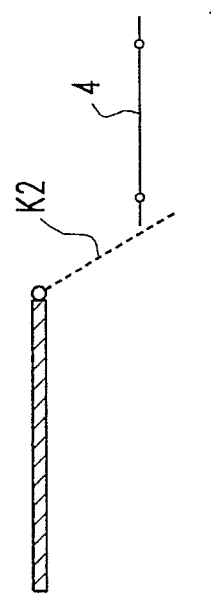
Figure 3C:
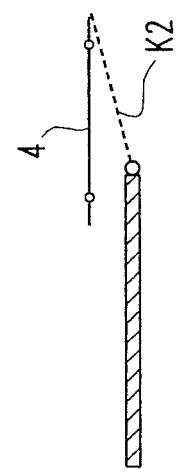
Figure 3C:
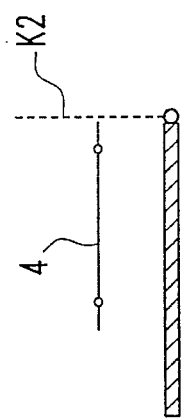

In the following, the transport process using the transport device according to the invention with the sealing doors K1 and K2 will be explained in more detail with reference to FIGS. 3a to 3c.

Initially, the sealing door K2 is closed while the sealing door K1 and the aperture door 2a are open. The workpiece support 4 is in position 1.) according to FIG. 3b. The workpiece is placed on the workpiece support 4. Thereafter, the workpiece support 4 moves into the direction of the position 1.) according to FIG. 3c. The aperture door 2a is closed and the door K1 follows the movement of the workpiece support 4. After position 1.) according to FIG. 3c has been reached, the sealing door K2 opens in front of the workpiece support 4 moving into position 3.) in FIG. 3c. Subsequently, the workpiece support 4 is immersed into the medium container 3 and the soldering is performed. After the soldering, the workpiece support 4 is conveyed back to the closed sealing door K1 (position 3.) in FIG. 3b) and the sealing door K2 moves subsequently into the direction of position 1.) in FIG. 3c. After opening the sealing door K1, the workpiece support 4 moves into the direction of position 1.) in FIG. 3b and the aperture of the sealing door K2 is closed after the workpiece support 4 has passed through it. After that, the aperture door 2a opens and the soldered part can be removed.

In the case of an embodiment according to the invention with two transport units and four sealing doors K1 to K4 (not shown), three sealing doors K1 to K3 and the second aperture door 2b are initially closed and the door K1 and the first aperture door 2a are open. The workpiece support 4 with the workpiece is removably attached on the struts 6a and 6b. Subsequently, the process mentioned in connection with only one transport unit is analogously carried out until the soldering process is finished and the workpiece support 4 is moved out of the medium container 3. After that, the struts 6a and 6b of the second transport unit receive the workpiece support 4 and carry it to the closed fourth sealing door K4, followed by the third sealing door K3. The fourth sealing door K4 is opened and the aperture of the third sealing door K3 is closed after the workpiece support 4 has passed through it. Then, the second aperture door 2b opens and the soldered workpiece can be removed.

Furthermore, it is also possible according to the invention to arrange a plurality of transport devices behind one another to carry out e.g. different soldering processes in a plurality of vapor-phase soldering equipments in an in-line process or to provide drying zones subsequent to the vapor-phase soldering equipment. The number of transport devices located behind each other can be varied by simple rearrangement measures.

I claim:

1. A transport device for a vapor-phase soldering equipment comprising a housing (1), a medium container (3) and at least one aperture (2) for loading and removing the part to be soldered, comprising a) a support (4) for the part to be soldered, and
   b) a transport unit comprising
      $b_1$) a holder for said support (4), said holder pivoting about an axis, and
      $b_2$) a drive which acts on the holder, and
      $b_3$) a stabilizing device to guide the support (4) in parallel when the holder pivots, wherein the holder and the stabilizing device comprise two front and rear parallel struts (6a and 6b, respectively) which are positioned at the front and rear end of the support (4) respectively, and which are removably and pivotably fixed to said support in bearings (5a and 5b, respectively), the front pair of struts (6a) being drivable via a drive shaft (7a) at its lower end and the rear pair of struts (6b) pivoting about a bearing shaft (7b) at its lower end, and the support (4) together with the front and rear struts (6a and 6b, respectively) pivoting about the drive shaft (7a) and the bearing shaft (7b) in such a way that the plane of the support (4) is displaced in parallel.

2. The transport device according to claim 1, characterized in that the struts (6a, 6b) are formed as straight rods.

3. The transport device according to claim 1, characterized in that the struts (6a, 6b) are bent.

4. The transport device according to claim 1, characterized in that the transport unit is mounted on a carriage and can be moved horizontally.

5. The transport device according to claim 1, wherein a sealing door (K2) is located behind the aperture (2) in the transport path of the support (4) and closes the transport path in the closed state.

6. The transport device according to claim 1 comprising a first and a second sealing door (K1 and K2, respectively), the first and the second sealing door (K1 and K2, respectively) being located behind one another and behind the aperture (2) in the transport path of the support (4), and the sealing doors (K1 and K2) closing the transport path in the closed state.

7. The transport device according to claim 1, wherein the transport unit is provided at least in duplicate as first and second transport units, wherein the second transport unit is located behind the first transport unit and behind the medium container (3) and the support (4) can be received by the second transport unit and transported to a second aperture.

8. The transport device according to claim 1, wherein the at least one aperture (2) can be closed in a sealing manner by doors (2a).

9. A transport device for a vapor-phase soldering equipment comprising a housing (1), a medium container (3) and at least one aperture (2) for loading and removing the part to be soldered, comprising
   a) a support (4) for the part to be soldered, and
   b) a transport unit comprising
      $b_1$) a holder for said support (4), said holder pivoting about an axis, and
      $b_2$) a drive which acts on the holder, and
      $b_3$) a stabilizing device to guide the support (4) in parallel when the holder pivots, and
   a sealing door (K2) is located behind the aperture (2) in the transport path of the support (4) and closes the transport path in the closed state.

10. A transport device for a vapor-phase soldering equipment comprising a housing (1), a medium container (3) and at least one aperture (2) for loading and removing the part to be soldered, comprising
    a) a support (4) for the part to be soldered, and
    b) a transport unit comprising
       $b_1$) a holder for said support (4), said holder pivoting about an axis, and
       $b_2$) a drive which acts on the holder, and
       $b_3$) a stabilizing device to guide the support (4) in parallel when the holder pivots, and a first and a second sealing door (K1 and K2, respectively),
    the first and the second sealing doors (K1 and K2, respectively) being located behind one another and behind the aperture (2) in the transport path of the support (4), and the sealing doors (K1 and K2) closing the transport path in the closed state.

11. A process for operating a transport device according to claim 10, comprising the steps of:
    a) conveying the part to be soldered through the aperture (2) onto the support (4) while the first sealing door (K1) is open and the second sealing door (K2) is closed,
    b) moving the support (4) through the aperture of the first sealing door (K1) to the second sealing door (K2),
    c) closing the aperture (2),
    d) opening the second sealing door (K2),
    e) moving the support (4) through the aperture of the second sealing door (K2),
    f) closing the first sealing door (K1) behind the support (4),
    g) moving the support (4) until it is immersed into the medium container (3),
    h) moving the support (4) back to the first sealing door (K1) after the soldering process,
    i) opening the first sealing door (K1),
    j) moving the support (4) through the aperture of the first sealing door (K1),
    k) closing the second sealing door (K2) behind the support (4), and
    l) optionally opening the aperture (2) and removing the soldered part.

12. A transport device for a vapor-phase soldering equipment comprising a housing (1), a medium container (3) and at least one aperture (2) for loading and removing the part to be soldered, comprising
    a) a support (4) for the part to be soldered, and
    b) a transport unit comprising
       $b_1$) a holder for said support (4), said holder pivoting about an axis, and
       $b_2$) a drive which acts on the holder, and
       $b_3$) a stabilizing device to guide the support (4) in parallel when the holder pivots, and
    the transport unit is provided at least in duplicate as first and second transport units, wherein the second transport unit is located behind the first transport unit and behind the medium container (3) and the support (4) can be received by the second transport unit and transported to a second aperture.

13. The transport device according to claim 12, wherein two sealing doors (K2) are located behind the first aperture (2) and in front of the second aperture (2), respectively, in the transport path of the support (4) and close the transport path (1) in the closed state.

14. The transport device according to claim 12 comprising first to fourth sealing doors (K1 to K4),
    the first and second sealing doors (K1 and K2, respectively) being located behind one another and behind the first aperture (2) in the transport path of said support,
    the third and fourth sealing doors being located behind one another in the transport path of said support and in front of a second aperture, and
    the sealing doors closing the transport path in the closed state.

15. The process of operating a transport device according to claim 14 comprising the steps of:
    a) conveying the support (4) with the part to be soldered through the first aperture (2) and arranging the support (4) on the first transport unit while the first sealing door (K1) is open and the second to fourth sealing doors (K2 to K4) are closed,
    b) moving the support (4) through the aperture of the first sealing door (K1) to the second sealing door (K2),
    c) optionally closing the first aperture (2),
    d) opening the second sealing door (K2),
    e) moving the support (4) through the aperture of the second sealing door (K2),
    f) closing the first sealing door (K1) behind the support (4),
    g) opening the third sealing door (K3),
    h) moving the support (4) until it is immersed into the medium container (3),
    i) removing the support (4) from the medium container (3) after the soldering process,
    j) take-over of the support (4) by the second transport unit, the process step j) being performed either before step h), between steps h) and i) or after step i),
    k) moving the support (4) through the aperture of the third aperture door to the fourth sealing door (K4),
    l) opening the fourth sealing door (K4),
    m) moving the support (4) through the aperture of the third sealing door (K3),
    n) closing the third sealing door (K3) behind the support (4),
    o) opening the second aperture and
    p) removing the support (4) with the soldered part.

16. A transport device for a vapor-phase soldering equipment comprising a housing (1), a medium container (3) and at least one aperture (2) for loading and removing the part to be soldered, comprising a) a support (4) for the part to be soldered, and b) a transport unit comprising $b_1$) a holder for said support (4), said holder pivoting about an axis, and $b_2$) a drive which acts on the holder, and $b_3$) a stabilizing device to guide the support (4) in parallel when the holder pivots, and a device for precipitating vaporous soldering medium is provided between the aperture (2) and a sealing door.

17. A transport device for a vapor-phase soldering equipment comprising a housing (1), a medium container (3) and at least one aperture (2) for loading and removing the part to be soldered, comprising a) a support (4) for the part to be soldered, and b) a transport unit comprising $b_1$) a holder for said support (4), said holder pivoting about an axis, and $b_2$) a drive which acts on the holder, and $b_3$) a stabilizing device to guide the support (4) in parallel when the holder pivots, and the at least one aperture (2) can be closed in a sealing manner by doors (2a).

18. A transport device for a vapor-phase soldering equipment comprising a housing (1), a medium container (3) and at least one aperture (2) for loading and removing the part to be soldered, comprising a) a support (4) for the part to be soldered, and b) a transport unit comprising $b_1$) a holder for said support (4), said holder pivoting about an axis, and $b_2$) a drive which acts on the holder, and $b_3$) a stabilizing device to guide the support (4) in parallel when the holder pivots, wherein the transport unit is mounted on a carriage and can be moved horizontally.

* * * * *